(12) United States Patent
Ramakrishnan et al.

(10) Patent No.: US 12,546,627 B2
(45) Date of Patent: Feb. 10, 2026

(54) STATE ESTIMATION USING SPARSE HALL SENSOR-BASED SENSING

(71) Applicant: Siemens Healthcare Diagnostics Inc., Tarrytown, NY (US)

(72) Inventors: Narayanan Ramakrishnan, New City, NY (US); Mark Edwards, Armonk, NY (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 0 days.

(21) Appl. No.: 19/105,787

(22) PCT Filed: Aug. 18, 2023

(86) PCT No.: PCT/US2023/072520
§ 371 (c)(1),
(2) Date: Feb. 21, 2025

(87) PCT Pub. No.: WO2024/044517
PCT Pub. Date: Feb. 29, 2024

(65) Prior Publication Data
US 2025/0264341 A1 Aug. 21, 2025

Related U.S. Application Data

(60) Provisional application No. 63/373,357, filed on Aug. 24, 2022.

(51) Int. Cl.
*G01D 5/14* (2006.01)
*G01N 35/00* (2006.01)

(52) U.S. Cl.
CPC ......... *G01D 5/145* (2013.01); *G01N 35/0099* (2013.01)

(58) Field of Classification Search
None
See application file for complete search history.

(56) References Cited

U.S. PATENT DOCUMENTS

| 6,876,896 | B1 | 4/2005 | Ortiz et al. |
| 9,346,371 | B2 | 5/2016 | King et al. |
| 2014/0373747 | A1 | 12/2014 | Yagci et al. |

(Continued)

FOREIGN PATENT DOCUMENTS

| CA | 3203887 A1 | 7/2022 |
| EP | 3206036 B1 | 8/2020 |

(Continued)

OTHER PUBLICATIONS

PCT International Search Report and Written Opinion dated Feb. 1, 2024 (7 Pages).

(Continued)

*Primary Examiner* — John E Breene
*Assistant Examiner* — Nigel H Plumb

(57) ABSTRACT

A system and method of tracking vessel movers within a liquid handler system using sparse sensor assemblies. The method includes mapping received sensor signals to pre-characterized functions and determining the positions of the vessel movers with respect to a single sensor from the sensor assembly accordingly. The sensors in the sparse sensor assembly can be positioned to have no or minimal overlap between their sensing ranges.

16 Claims, 14 Drawing Sheets

(56) References Cited

U.S. PATENT DOCUMENTS

| | | |
|---|---|---|
| 2017/0363608 A1 | 12/2017 | Sinz |
| 2019/0170781 A1* | 6/2019 | Stacey .................. G01N 35/04 |
| 2019/0237190 A1* | 8/2019 | Frone ............... G01N 35/00871 |
| 2019/0277869 A1 | 9/2019 | Stein et al. |
| 2020/0287493 A1 | 9/2020 | Flixeder et al. |
| 2021/0025907 A1* | 1/2021 | Hirabayashi ....... G01N 35/1002 |
| 2021/0131839 A1 | 5/2021 | Huang et al. |

FOREIGN PATENT DOCUMENTS

| | | |
|---|---|---|
| EP | 2856150 B1 | 4/2022 |
| WO | 2021/157280 A1 | 8/2021 |
| WO | 2023/081838 A1 | 5/2023 |

OTHER PUBLICATIONS

Extended EP Search Report dated Nov. 11, 2025 of corresponding European Application No. 23858190.4, 5 Pages.

* cited by examiner

STATE ESTIMATION USING SPARSE HALL SENSOR-BASED SENSING

CROSS REFERENCE TO RELATED APPLICATION

This application claims the benefit of U.S. Provisional Patent Application No. 63/373,357, entitled "STATE ESTIMATION USING SPARSE HALL SENSOR-BASED SENSING" filed Aug. 24, 2022, the disclosure of which is hereby incorporated by reference in its entirety for all purposes.

BACKGROUND

Liquid handlers are robotic systems that are designed to dispense and process selected quantities of reagents, samples, or other liquids. Some liquid handlers are additionally adapted to analyze samples using, for example, immunoassay and/or clinical chemistry techniques. Such types of liquid handlers could be referred to as "analyzers" or "analyzer systems." Some liquid handlers can include a number of modules (also referred to as stations) and a transport system to move samples between the various modules. It is highly desirable for the liquid handler transport systems to move the sample containers in a smooth manner, avoid causing the sample containers to collide with each other and, otherwise prevent liquids from spilling from their containers during transport. In particular, liquid spills waste reagents and/or samples (which could potentially impact the integrity of any tests being performed) and if the spill occurs on the track can also create obstructions that could negatively impair the movement of subsequent sample containers.

Liquid handlers are often used in in vitro diagnostics (IVD) applications. IVD allows labs to assist in the diagnosis of disease based on assays performed on patient fluid samples. IVD includes various types of analytical tests and assays related to patient diagnosis and therapy that can be performed by analysis of a liquid sample taken from a patient's bodily fluids, or abscesses. These assays are typically conducted with automated clinical chemistry analyzers onto which fluid containers, such as tubes or vials, containing patient samples have been loaded. The analyzer extracts a liquid sample from the vial and combines the sample with various reagents in special reaction cuvettes or tubes (referred to, generally, as reaction vessels). In some conventional systems, a modular approach is used for analyzers. A lab automation system can shuttle samples between one sample processing module (module) and another module. Modules may include one or more stations, including sample handling stations and analyzer modules/testing stations (e.g., a unit that can specialize in certain types of assays), or can otherwise provide testing services to the larger analyzer, which may include immunoassay (IA) and clinical chemistry (CC) stations. Some traditional IVD automation track systems comprise systems that are designed to transport samples from one fully independent module to another standalone module. This allows different types of tests to be specialized in two different stations/modules, or allows two redundant stations to be linked to increase the volume of sample throughput available. These lab automation systems, however, are often bottlenecks in multi-station analyzers. Relatively speaking, traditional lab automation systems lack large degrees of intelligence or autonomy to allow samples to independently move between stations.

Conventional liquid handler systems track vessel movers and the liquid samples carried thereby throughout the track systems interconnecting the modules using sensor assemblies that consist of relatively large numbers of sensors that have overlapping sensing ranges. In some conventional liquid handler systems, individual track segments could have up to twenty Hall effect sensors. This redundancy is intended to provide robustness in the tracking of the liquid samples as they move along the track system between the various modules of the liquid handler system. However, the large number of sensors that are utilized substantially increases the cost of the liquid handler systems. Further, it is computationally expensive to make use of such a large number sensors, particularly in multiplexing the signals from all of the sensors. Therefore, there is a need in the technical field for simplified sensing approaches that reduce the number of sensors that are utilized to track the vessel movers in order to decrease costs and decrease the computational needs of the vessel mover tracking systems.

SUMMARY

Described herein are systems and methods for tracking vessel movers in a liquid handler system and/or the liquid samples carried thereby using sparse sensor assemblies.

In one embodiment, the present disclosure is directed to a tracking system for tracking a vessel mover in a liquid handler system having a vessel tracking system that includes a sensor assembly associated with the track system. The sensor assembly has a plurality of Hall effect sensors positioned along the track system, which are configured to detect a magnet positioned with the vessel mover and are positioned such that a signal from each of the Hall effect sensors does not overlap beyond a threshold with an adjacent Hall effect sensor that is less than 6 dB of a sensor peak value. A control system that is coupled to the sensor assembly is configured to receive a signal from each of the plurality of Hall effect sensors, determine which of the plurality of Hall effect sensors the vessel mover falls within a sensing range of to define a sensing Hall effect sensor, map the signal from the sensing Hall effect sensor to a function, and determine a position of the vessel mover based on the mapping of the signal from the sending Hall effect sensor to the function. The function is configured to relate a strength of the signal to a distance with respect to the sending Hall effect sensor.

In another embodiment, the present disclosure is directed to a liquid handler system for processing a liquid sample having one or more modules configured to process the liquid sample and a track system interconnecting the one or more modules, which is configured to support one or more vessel movers thereon, each having magnets and configured to receive the liquid sample. A sensor assembly is associated with the track system, and has a plurality of Hall effect sensors positioned along the track system, which are configured to detect a magnet positioned with the vessel mover and are positioned such that a signal from each of the Hall effect sensors does not overlap beyond a threshold with an adjacent Hall effect sensor that is less than 6 dB of a sensor peak value. A control system is coupled to the sensor assembly and is configured to receive a signal from each of the plurality of Hall effect sensors, determine which of the plurality of Hall effect sensors the vessel mover falls within a sensing range of to define a sensing Hall effect sensor, map the signal from the sensing Hall effect sensor to a function, and determine a position of the vessel mover based on the mapping of the signal from the sending Hall effect sensor to the function. The function is configured to relate a strength of the signal to a distance with respect to the sending Hall effect sensor.

In another embodiment, the present disclosure is directed to a method of tracking vessel movers in a liquid handler system for processing a liquid sample, having one or more modules configured to process the liquid sample, and a track system interconnecting the one or more modules and configured to support one or more vessel movers thereon, each having a magnet and configured to receive the liquid sample. A sensor assembly is associated with the track system and includes a plurality of Hall effect sensors positioned along the track system, each configured to detect a magnet positioned with the vessel mover and positioned such that a signal from each of the Hall effect sensors does not overlap beyond a threshold that is less than 6 dB of a sensor peak value with an adjacent Hall effect sensor. The method, performed by a control system coupled to the sensor assembly, includes steps of receiving a signal from each of the plurality of Hall effect sensors, determining which of the plurality of Hall effect sensors the vessel mover falls within a sensing range of to define a sensing Hall effect sensor, mapping the signal from the sensing Hall effect sensor to a function, and determining a position of the vessel mover based on the mapping of the signal from the sensing Hall effect sensor to the function. The function is configured to relate a strength of the signal to a distance with respect to the sending Hall effect sensor.

According to one aspect of these embodiments, the control system is configured to fuse the plurality of singulated signals via an extended Kalman filter. According to another aspect, the control system is configured to fuse the plurality of singulated signals via at least one of a weighted estimate and a cascaded estimate. According to another aspect, the signals from each adjacent pair of the Hall effect sensors overlap more than 6 dB over a noise floor. According to another aspect, the function is one of a group consisting of a Lorentzian function, a Sinc function, and a Gaussian function. According to another aspect, the sensor assembly is divided into segments, each having a circuit board. According to another aspect, the control system determines that the vessel mover is close to a junction of two adjacent segments to initiate a handoff of control of the vessel mover between segments.

FIGURES

The accompanying drawings, which are incorporated in and form a part of the specification, illustrate the embodiments of the invention and together with the written description serve to explain the principles, characteristics, and features of the invention. In the drawings.

DESCRIPTION

Figure 1:
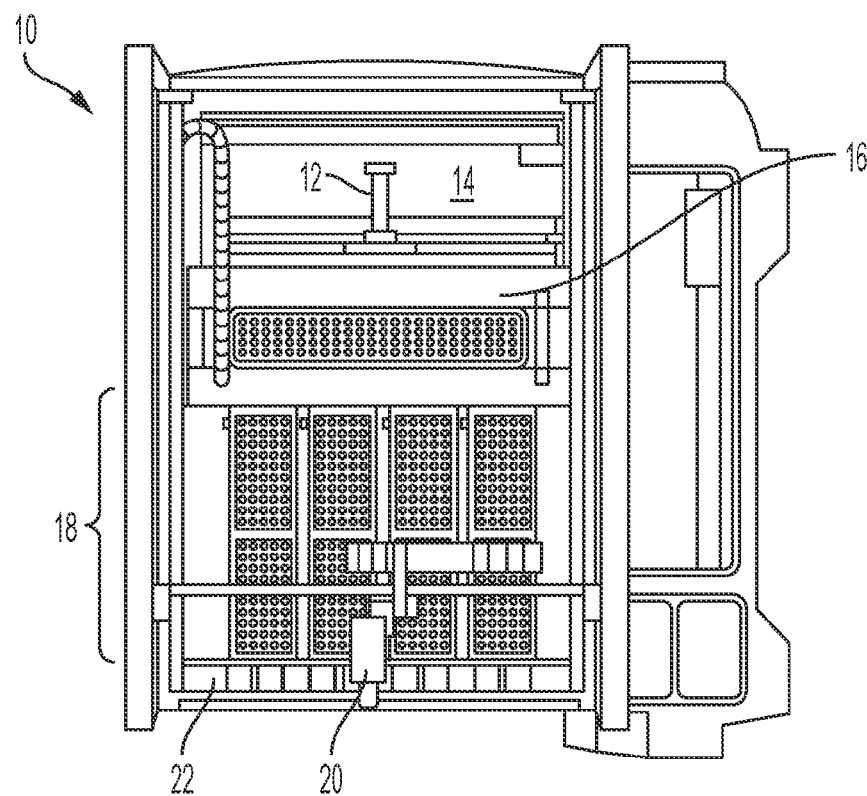
FIG. 1 is a top down view of an exemplary sample handling module, in accordance with at least one aspect of the present disclosure.

This disclosure is not limited to the particular systems, devices and methods described, as these may vary. The terminology used in the description is for the purpose of describing the particular versions or embodiments only, and is not intended to limit the scope.

As used herein, the terms "algorithm," "system," "module," "engine," or "architecture," if used herein, are not intended to be limiting of any particular implementation for accomplishing and/or performing the actions, steps, processes, etc., attributable to and/or performed thereby. An algorithm, system, module, engine, and/or architecture may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular algorithm, system, module, and/or engine is, unless otherwise specified, for purposes of convenience of reference and not intended to be limiting to a specific implementation. Additionally, any functionality attributed to an algorithm, system, module, engine, and/or architecture may be equally performed by multiple algorithms, systems, modules, engines, and/or architectures incorporated into and/or combined with the functionality of another algorithm, system, module, engine, and/or architecture of the same or different type, or distributed across one or more algorithms, systems, modules, engines, and/or architectures of various configurations.

Automated Liquid Handler Systems

A liquid handler or liquid handling robot a system that is designed to dispense and process any type of liquid, including reagents and patient samples. Liquid handles are particularly adapted to automate workflows in life science laboratories, such as clinical laboratories or research laboratories. Some liquid handlers, which can be referred to as "analyzers" or "analyzer systems" are additionally adapted to process and perform tests on samples using, for example, immunoassay and/or clinical chemistry techniques.

Liquid handlers can include automation systems, either integrally or as modules coupled to the liquid handlers. Some liquid handler systems can include a number of modules or stations that are adapted to perform different tasks or tests. In these embodiments, the automation systems can include a transport system that is adapted to transport containers of samples and/or reagents between the various modules or stations. As noted above, transport systems can include friction-based movement systems, conveyor belts, and magnetically driven movement systems. Automation systems can further include sensor assemblies for detecting parameters associated with the containers or other aspects of the transport systems and control systems that are configured to control the movement of the containers accordingly.

In some embodiments, liquid handler systems can utilize a modular system including an automated clinical chemistry analyzer module and an automated immunoassay analyzer module, with sample loading capability to transport patient samples to and from analyzer module(s) where in vitro diagnostic assay analyses are performed. The system can be scalable in multiple configurations of the modules allowing customer yearly throughput needs ranging from low volume to very high volume/mega market segments (i.e., 500,000 to 5M or more tests per year).

In some embodiments, the automation system can be described as a process control manager (PCM) that manages the processing of samples. This includes providing input and output for samples into and out of the system, temporary storage of samples while awaiting processing, scheduling of samples for processing at various analyzers attached to the PCM, facilitation of the movement of samples throughout an automation track (including onto and off of the automation track), and, in some embodiments, maintenance of the automation systems. In various embodiments, a PCM can include a variety of different modules, including a sampler handler and a vessel mover.

The sample handler provides a means for the user to load and unload regular samples, STAT samples, and control/calibrator vials onto and off of the system. Within the sample handler, the robot subsystem is responsible for moving these tubes between other subsystems and modules, including the sample I/O (drawer trays), control storage, and the vessel mover.

The vessel mover subsystem handles this material distribution. Under normal conditions, a lab technician never operates the vessel mover track directly. The vessel mover manages carriers on an automation track that moves samples or reagents, each carrier having a dedicated type of holders. In some embodiments, liquid handler systems can include reagent carriers that are configured to accept a reagent cartridge and to transport the reagent cartridge, via the automation track, to a location accessible to the one or more analyzer modules. In some embodiments, a reagent carrier can be adapted to handle reagents from both an immunoassay module and clinical chemistry module.

FIG. 1 shows a top down view of an exemplary sample handler 10 that may be used for some embodiments. Within this figure, sample handler 10 is oriented so that the front (i.e., the face that the operator interacts with) is at the bottom of the page, while the back of the automation track is located at the top of the page. Sample handler 10 includes a tube characterization station 12 at the robot/track interface. Tube characterization station 12 characterizes tubes and carriers when tubes are placed on carriers on track 14. This allows information to be ascertained about the identity of the tube placed in each carrier, and the physical condition of each tube (e.g., size of the tube, fluid level, whether there is a tube top cup, etc.) Adjacent to the tube characterization station 12 sits a control/calibrator storage region 14. This allows long-term refrigerated storage of control and calibrator fluids near the track, allowing these fluids to be easily placed into carriers on the track for movement to relevant locations in the analyzer. The location of storage 16 also allows input/output drawers 18 to be placed in the front of sample handler 10. In this example, there are four adjacent drawers 18 that can be individually opened and pulled out.

A robot arm 20 can move in two dimensions to pick up any of the tubes in drawers 18 and move those tubes to and from storage 16 and carriers on track 14. Robot arm 20 can be positioned by moving a gantry from the front to the back of a sample handler 10 while a carriage moves side to side along that gantry. Opposable end effectors can then be moved vertically to reach down to pick up tubes, closing the end effectors when they are properly positioned to engage the tube.

To assist the robot arm 20 in successfully engaging each tube, a drawer vision system 22 is placed above the drawers at the opening to the drawers. This allows a series of images to be taken, looking down at the tubes in the trays, as the trays are moved past the drawer vision system. By strobing a series of cameras, multiple images can be captured in a buffer, where each tube appears in multiple images. These images can then be analyzed to determine the physical characteristics of each tube. For example, diameters and heights of each tube can be determined. Similarly, the capped or uncapped states of each sample can be quickly determined. Furthermore, the presence or absence of a tube top cup (a small plastic well that is placed on top of a tube to allow a tube to transport a much smaller volume with greater depth of the sample, to allow aspiration to more easily take place) can be ascertained. Similarly, the characteristics of any cap can be ascertained by the images. This can include certain color markings on the cap to identify a given sample as a higher priority (STAT) sample.

The module manager PC can utilize this information to schedule samples to be moved from each tray in drawers 18 into carriers on track 14. The module manager PC can also instruct robot arm 20 how to interact with each tube, including identifying the proper height for the end effectors before engagement, and the proper force or distance to use when engaging the end effectors to accommodate multiple diameters of tubes.

Figure 2:
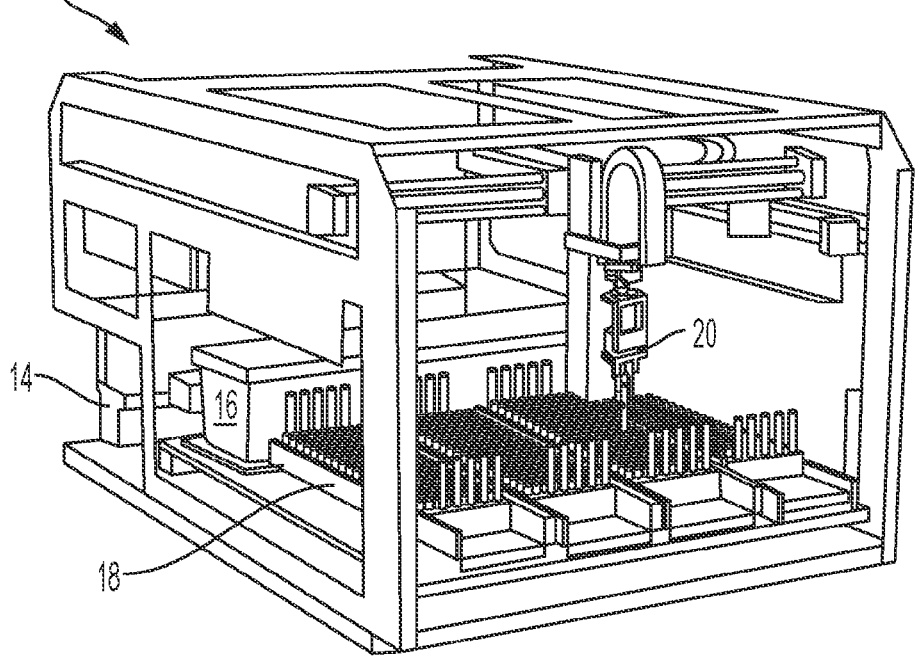
FIG. 2 is a perspective view of an exemplary sample handling module in accordance with at least one aspect of the present disclosure.

FIG. 2 is a perspective view of a sample handler 10. In this example, track 14 is roughly parallel with the front face of drawers 18, while refrigerated storage 16 is a large physical object between drawers 18 and track 14. Meanwhile, robot arm 20 is moved on supports, well above the height of drawers 18 and refrigerated storage 16. In some embodiments, the sample handler 10 can include a tube characterization station 12 and a drawer vision system 22; however, these stations are omitted from the view in FIG. 2 in order to allow the internals of sample handler 10 to be better understood.

Figure 3:
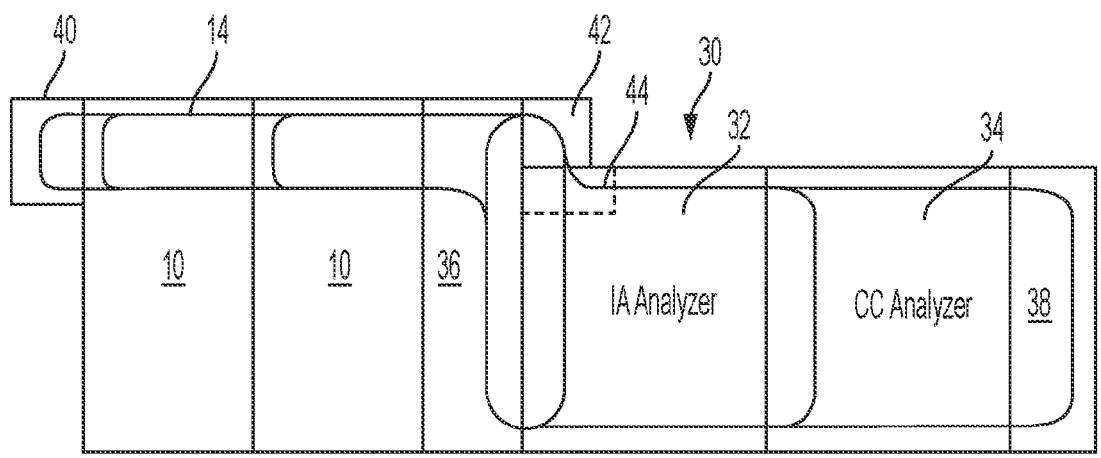
FIG. 3 is a diagrammatic view of an exemplary integral, modular automation track system, in accordance with at least one aspect of the present disclosure.

FIG. 3 illustrates the vessel mover components of the PCM that moves samples from an input region to analyzer modules, assists in handling those samples within the analyzer, and returns process samples to the output region of the sample handler. Multi module analyzer system 30 includes multiple interconnected modules. In this example, system 30 includes multiple sample handlers 10. By utilizing multiple sample handlers, more sample trays can be placed into the system, allowing a larger batch to be started at the beginning of the shift. Furthermore, this allows twice as many samples to be placed onto, and taken off of, the track. This means that, for larger systems with multiple analyzer modules that can operate in parallel, input/output throughput can match the analysis throughput of the parallel analyzers. For example, if an analyzer module can handle 500 samples per hour, and three analyzer modules are used, the input/output demand for feeding these modules may be up to 1500 samples per hour. In some embodiments, a single sample handler may not be able to handle this demand, necessitating adding multiple sample handlers to keep up with the input/output demand of the analyzer modules.

Furthermore, in some embodiments, one of the sample handlers can be set up to be used as an input, while the other sample handler can be set up as an output. By using a modular approach, a single sample handler 10 can be used but, for larger systems, two or more sample handlers can be used.

In an exemplary system 30, two analyzer modules are utilized. Analyzer module 32 is an immunoassay (IA) analyzer. Analyzer module 34 is a clinical chemistry (CC) analyzer. These two analyzer modules perform different assays, testing for different characteristics of patient samples.

Track 14 is a multi-branching track that forms the heart of the vessel mover system. As can be seen, track 14 comprises branches and lengths that are provided integral to sample handlers 10 and analyzer modules of 32 and 34. The functions of the individual branches will be explained with respect to FIGS. 5 and 6. In addition to the track segments provided by these modules, additional modules 38, 40, and 42 provide short, dedicated track sections that may be bolted to the track portions provided by the other modules. Track modules 36, 38, 40, and 42 provide powered track segments, without additional hardware related to sample handler modules or analyzer modules. Whereas modules 10, 32, and 34 may be full cabinets extending from a laboratory floor to the height of track 14, and above, track segment modules 36, 38, 40, and 42 may be bolt-on segments that extend from the cabinets of the other modules, without requiring floor-length support. Each of the modules in FIG. 3 can be bolted together in modular fashion, utilizing leveling hardware, such that each track segment between adjacent modules forms a virtually seamless track for carriers to traverse the vessel mover system.

In exemplary system 30, it can be seen that section 44 of the track of analyzer module 32 may need to be altered from the corresponding section of analyzer module 34. In some embodiments, the track segments of analyzer modules are in the same configuration as that shown in analyzer module 34 when they are shipped from the factory. This allows multiple analyzers to be placed in series, simply bolting their respective track segments together to form a long chain. In some embodiments, where there is an offset between the back track segment of the sample handler modules and the analyzer modules, as is illustrated in system 30, an S-shaped bend may be needed to allow carriers to move from the back track section of analyzer modules to the back track section of the sample handler modules. In this example, this S-shaped bend is provided by bolting on track section 42 and the altered track segment in area 44. Thus, it should be understood that the track segments within analyzer modules, while integral to those modules, can be extensively modified at the time of installation, allowing multiple configurations of the track segments within an analyzer module. However, it should be understood that these track segments are still very much integral to those analyzer modules. In some embodiments, the back of analyzer modules 32 and 34 are flush with the backs of sample handlers 10, eliminating the need for altering track segment 44 and section 42, entirely.

Track segments 38 and 40 are U-shaped track segments that provide returns between front track segments and back track segments, allowing traffic to move around the track 14 without traversing interior chord segments within sample handler or analyzer modules. This allows the track 14 to form an outer loop, with main traffic moving along the perimeter of the analyzer modules. Meanwhile, the internal track sections bypass the main loop, providing a direct path between two sides of each analyzer module (front to back), which serves as a route for local traffic. These chord segments can also be referred to as internal segments/track sections, bypass segments/track sections, or, in some cases, local track sections. These chord segments bypass the outer loop to provide access to a pipette. This allows small physical queues relevant to each sample handler or analyzer module to utilize those interior chord segments, without blocking the overall flow of track 14.

A specialized track segment module 36 facilitates sample return and branching within track 14 to allow the central computer system of the PCM to direct traffic in flexible ways. The outside track portions provide a way for samples to move from sample handler modules 10 to track segments of analyzer module 32, and vice versa. Meanwhile, the inner chord of track segment module 36 provides a branch whereby samples can move from analyzer 32 to analyzer 34 (in a counterclockwise manner), without moving into sample handler modules 10. This facilitates multiple tests on a single sample tube, allowing sample tubes to freely move between analyzer modules, regardless of how they are arranged on the right-hand side of system 30. This gives the PCM scheduling software flexibility in how samples order the tests within analyzer modules, without increasing traffic on the track segments relating to sample handling. Track segment 36 provides a boundary between sources and sinks (e.g., sample handler modules 10) and processors (e.g., analyzer modules 32 and 34) by providing a branching loop within section 36 (and section 42, in some embodiments). This loop allows sample carriers to move between the sources, sinks, and processors, including allowing samples to loop without returning to the sources and sinks.

Not shown in FIG. 3 is the central computer that includes a system instrument manager software component. The instrument manager software consolidates information from lower-level modules, such as sample handler 10 and analyzer modules 32 and 34, to present this information to an operator. The instrument manager receives information from the other modules via a network within the system (e.g., an internal Ethernet network). Information may be requested and provided asynchronously between the modules and central computer. The central computer can also work between the LIS and vessel mover systems to schedule samples and their movement within the system. The central computer can also work between the vessel mover systems and individual modules to handoff control of the samples and to initiate testing of samples once they arrive at a location.

Additional information regarding in vitro diagnostics systems can be found in U.S. patent application Ser. No. 16/319,306, published as U.S. Patent Application Pub. No. 2019/0277869A1, titled AUTOMATED CLINICAL ANALYZER SYSTEM AND METHOD, filed Jan. 18, 2019, which is hereby incorporated by reference herein in its entirety.

PCB-Based Automation Track Configurations

Various liquid handlers can include a variety of different transport systems, including electro-magnetic drive systems, friction-based track systems, or conveyor belts. For example, some liquid handlers include a track having a plurality of synchronously controlled electro-magnetic coils. The vessel movers in this case typically consist of a permanent magnet array whose field interacts with that generated by the electro-magnet coil array on the track. In these analyzer systems, the automation track is configured to move the sample carriers via synchronously controlled electro-magnetic coils that propel the sample carriers along the analyzer system's track sections. However, conventional electro-magnetically driven transport systems use metallic substrates for the automation track. Metallic substrates have several disadvantages, including cost and weight, as generally discussed above. Accordingly, embodiments of transport systems described herein include PCB-based substrates for the automation track. In these embodiments, each track segment can include one or more PCBs having coil arrays that are configured to electromagnetically actuate the vessel mover to transport the vessel mover therealong.

In some embodiments, track sections are divided up into a number of coil boards. A coil board includes a linear array of coils that can be mounted the PCB substrate of the track. For straight sections of track, each coil board is straight, while, in corners or curves, coil boards include appropriately laid out coils to match the curve. All coil boards are controlled by master boards and node controllers. In some embodiments, each master board can control up to eight different coil boards. Meanwhile, a node controller is centralized. A single node controller can control the entire vessel mover track. In some embodiments, multiple distributed node controllers can be used for expandability. For example, in larger systems, where the track extends for several meters, multiple node controllers may be used, and control of carriers can be handed off as they traverse different regions of the track network.

Figure 4:
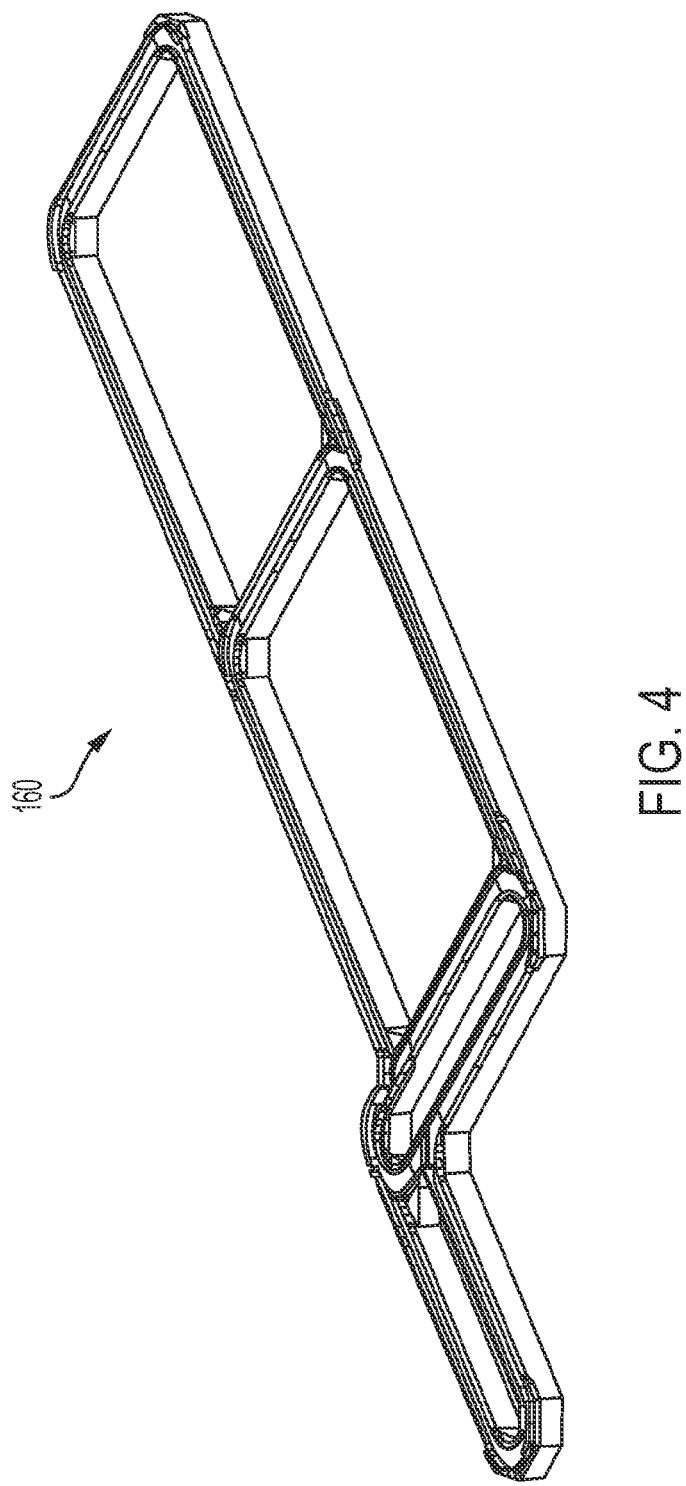
FIG. 4 is a perspective view of an exemplary automation track system, in accordance with at least one aspect of the present disclosure.
Figure 5:
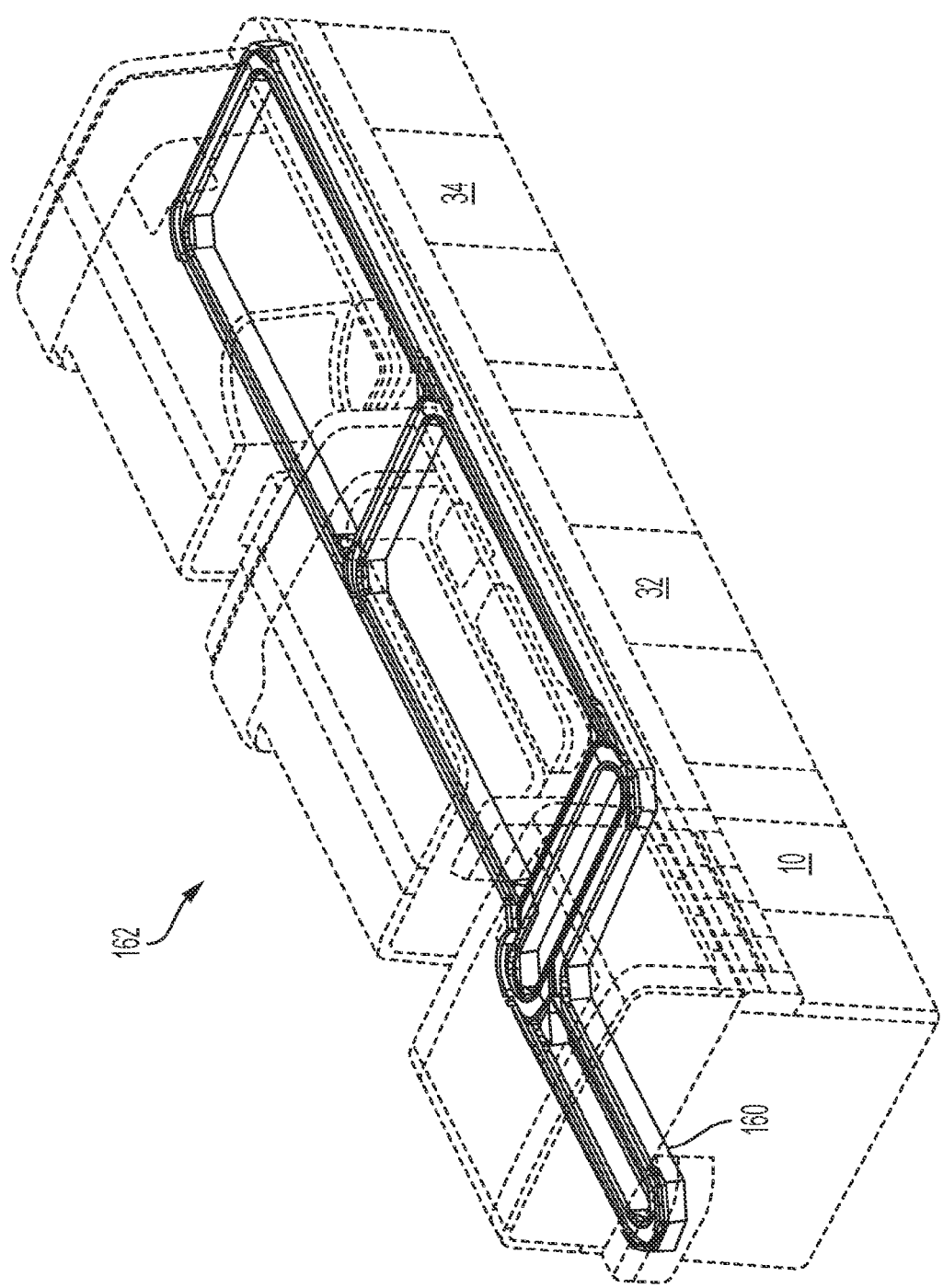
FIG. 5 is a perspective view of an exemplary automation track system, in accordance with at least one aspect of the present disclosure.

FIG. 4 shows a perspective view of track system 160. Track system 160 is configured to have a single sample handler unit and two analyzer modules. FIG. 5 shows track system 160 situated in a fully operational analyzer system 162 that includes a sample handler module 10 and two analyzer modules of 32 and 34. As can be seen, track system 160 is housed within the modules themselves, such that the track is not easily accessible to an operator. However, track 160 and analyzer system 162 utilize a modular design whereby track components reside within each module and each module can easily be linked together to join the track segments by placing adjacent modules in proximity and linking them. Lids above track 160 can be removed during installation or service to facilitate linking of tracks. In some embodiments, track sections are expanded by placing modules adjacent to one another and bolting the track sections of each module together forming a single multi-branching track system, such as track 160. Signaling cables can be daisy-chained together for ease of expanding control.

Figure 6:
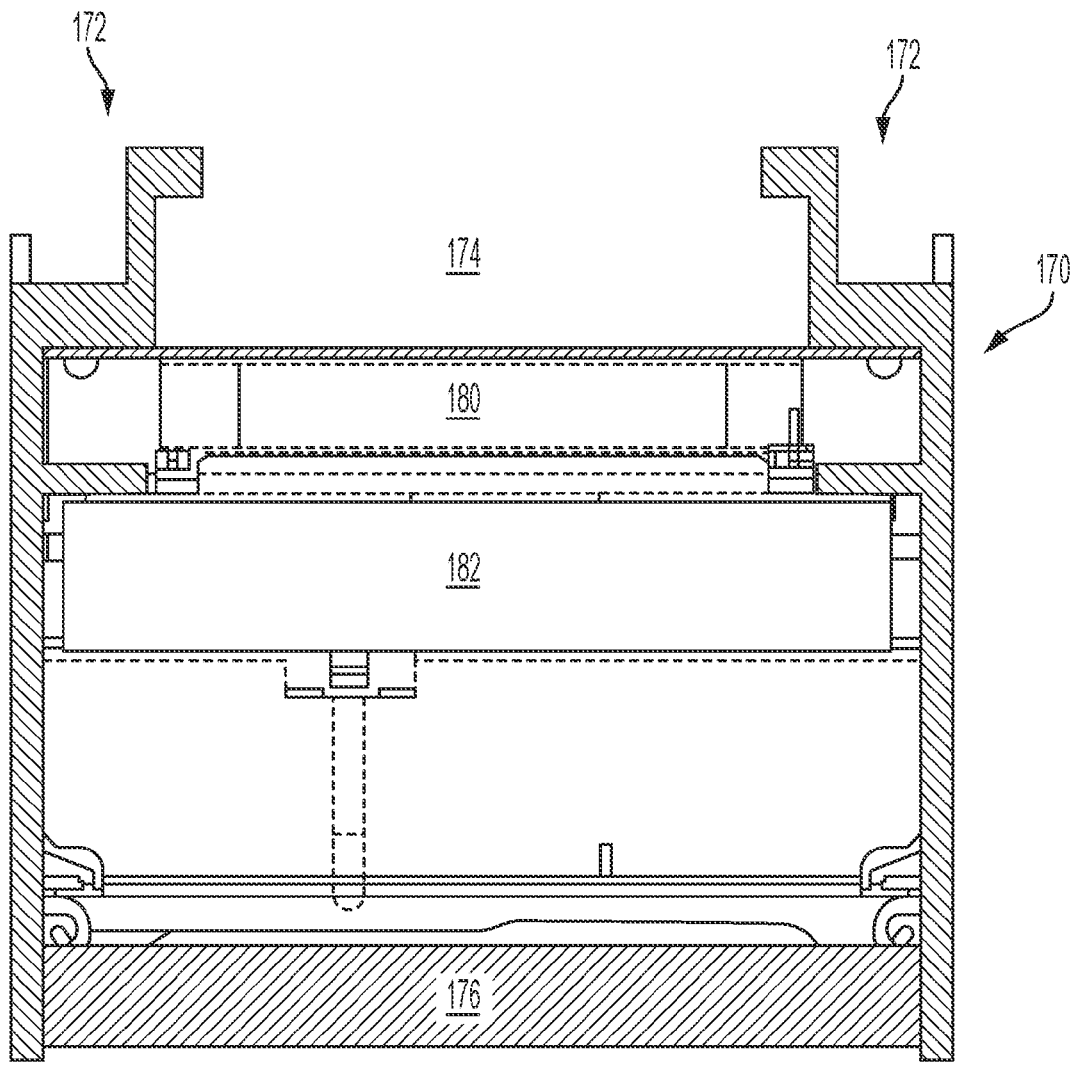
FIG. 6 is a cross sectional view of an exemplary automation track system, in accordance with at least one aspect of the present disclosure.

FIG. 6 shows a cross-sectional view of the track section 170. Track section 170 may be track section used in track 160. In this embodiment, carriers ride between rails 172 on a track surface 174. In some embodiments, rails 172 are aluminum extrusions that also include vertical sides on the exterior of the track components underneath track surface 174. These aluminum extrusions can include brackets to easily bolt internal components to these side pieces to form a track unit. In the embodiments described herein, the track surface 174 is a PCB. In various embodiments, the PCB track surface 174 can include one or more coatings or other components. At the bottom of the side components of rails 172 resides a baseplate 176. Baseplate 176 can be mounted to the modules containing track section 170 and provide support for the track system.

Beneath track surface 174 reside a series of coils 180. The longitudinal direction of track section 170 is into the page; as you travel along the track section 170, you encounter additional coils 180. Coils 180 are preferably mounted to coil boards 182 and are preferably laterally oblong to allow more coil density in the longitudinal direction of the track. In some embodiments, coil boards 182 are printed circuit boards (PCB) that include several coils 180 in the longitudinal direction. An exemplary coil board is 250 mm in length, accommodating all the coils 180 needed for 250 mm of track. Thus, a typical track section will have several coil boards 182, including dozens of coil boards 182 to make up an entire track system. In some embodiments, coil boards 182 receive a control signal to indicate the trajectory to apply to a carrier traveling along that coil board and a power source of 24 VDC. In some embodiments the PCB coil board itself forms the track (riding) surface. Coil boards 182 include coils 180, motor drivers to drive those coils, and one or more sensors to detect the presence of carriers traversing the track surface above the coil board by detecting the magnets of the carrier. These sensors can include Hall Effect sensors to detect the presence and location of the carrier traveling along the coil board. Accordingly, there may be more sensors than coils, allowing fine resolution of the position of a carrier traversing track surface 174. Furthermore, an RFID receiver may be utilized to receive an RFID signal that identifies the carrier traveling along the track surface. In some embodiments, magnetic signatures unique to each carrier can be detected by the Hall Effect sensors to determine the identity of the carrier magnetically. For example, a carrier traversing an array of Hall Effect sensors can be characterized at manufacturing to identify a unique signature of that carrier based on rise times and signal artifacts that are detected by the Hall Effect or sensor array as magnets in the carrier travel over that array. In some embodiments, smaller magnets than the main drive magnets may be placed in the bottom portion of a carrier to intentionally create a unique signature for each carrier at manufacturing. This magnetic signature can be correlated to an identity of each carrier in software for the vessel mover system. An exemplary linear synchronous motor drive system is described in U.S. Pat. No. 9,346,371.

Figure 7:
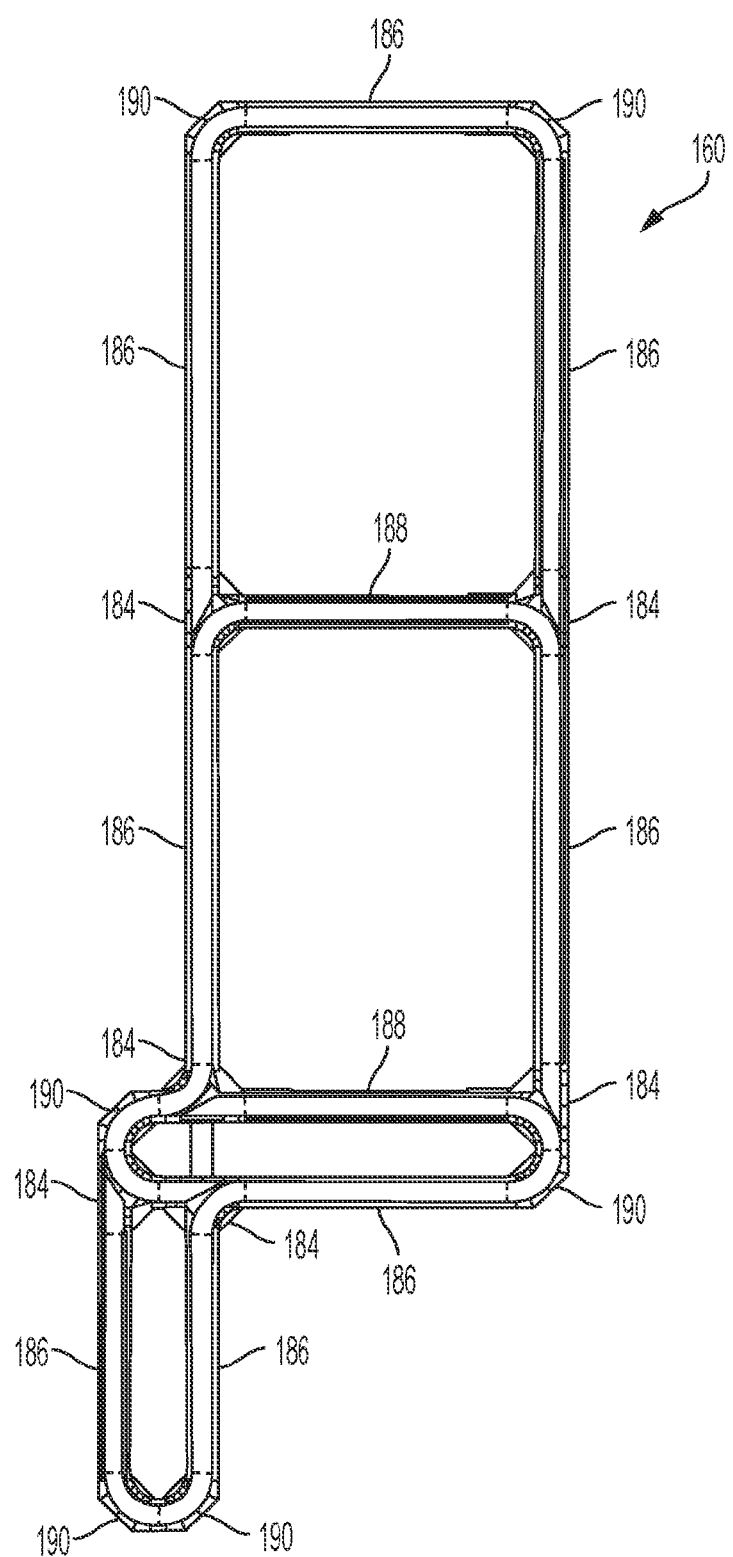
FIG. 7 is a top down view of an exemplary automation track system, in accordance with at least one aspect of the present disclosure.

FIG. 7 shows a top view of an exemplary track system 160 with the individual track sections identified. There are generally four types of track sections that make up the modular design of track system 160. Switching segments 184 are branches in the track. The track surface for switching segments 184 is generally T-shaped, with rounded inside edges. Meanwhile, the rails of switching segments 184 include one straight rail (top of the T), one radiused rail (one inside corner of the T), and one radiused rail that includes a switching mechanism (other inside corner of the T). This switching mechanism is a movable rail component that can be turned a predetermined number of degrees to act as a switch (e.g., 20-30 degrees, depending on geometry). On one side of the rail component, it acts as a straight rail. On the other side of the rail component, the rail presents itself as a radiused rail forming an outside corner of a turn. By switching a movable rail component, that movable rail component can either provide the outside of a turn, or a simple straightaway rail. Thus, the mobile component provides a binary switch whereby switching segment 184 presents itself as a turn or as a straightaway, depending on the control signal. This can be used to divert individual carriers based on the state of the switching segment. It should be noted that, while the track may be bidirectional, only one end of the T can be connected to the center portion of the T to form a turn. Thus, while switching segments 184 may have three ports, essentially, one port may be switched to either of the other two ports, but those two ports cannot be joined together.

A simpler type of track section is a straightaway, such as outside straightaway 186 or inside straightaway 188. The basic components of straightaways 186 and 188 are a track surface and rails, with a series of coil boards providing linear motive forces along the direction of that straightaway. Straightaways 186 and 188 are identified separately in FIG. 7 because inside straightaways 188 can be operated under the control of the local module, rather than a vessel mover controller that controls the entire track 160, in some embodiments. This allows each local module to independently operate track sections 188 to act as a local random-access queue. The vessel mover controller can hand off control to the local module after moving a carrier from a switching segment 184 to the local inside straightaway 188. Similarly, when a local module has completed aspirations on a sample residing on inside straightaway 188, that module may move the sample carrier into a switching segment 184 and hand off control to the vessel mover controller. In some embodiments, inside track sections 188 still operate under the control of the vessel mover controller that controls the entire track system 160. To control a local queue on inside straightaway 188, the local module can communicate directly with the vessel mover controller to request movement of carriers within track section 188. This allows the local module to manifest control over carriers in its queue by using a request to acknowledge the communication system, allowing the vessel mover controller to have expertise in moving individual carriers and operating track system 160.

A fourth type of track segment is a curved track segment 190. Curved track segment 190 provides a 90° bend with a predetermined radius (or other angular bend). This radius is preferably the same as the radius used in turns when switching track segments 184 are switched into a curve. The radius is chosen to minimize the space impact of curves while, at the same time, allowing carriers to move quickly around curves without encountering drastic lateral forces. Thus, the space requirements and speed requirements of automation track 160 can determine the radius of curved segments 190.

Electrically, curved segments 190 are substantially the same as straightaways 186 and 188. Each of these segments includes a plurality of coils that are activated, in sequence, to provide a linear motor in conjunction with magnets in the bottoms of carriers. Each coil is activated to provide a push or pull force on drive magnets placed in the bottom of each carrier. The speed at which coils are activated in sequence determines the speed of the carrier on that section of track. Furthermore, carriers may be moved into a position and stopped at a predetermined location with high resolution by activating coils at that location.

Figure 8:
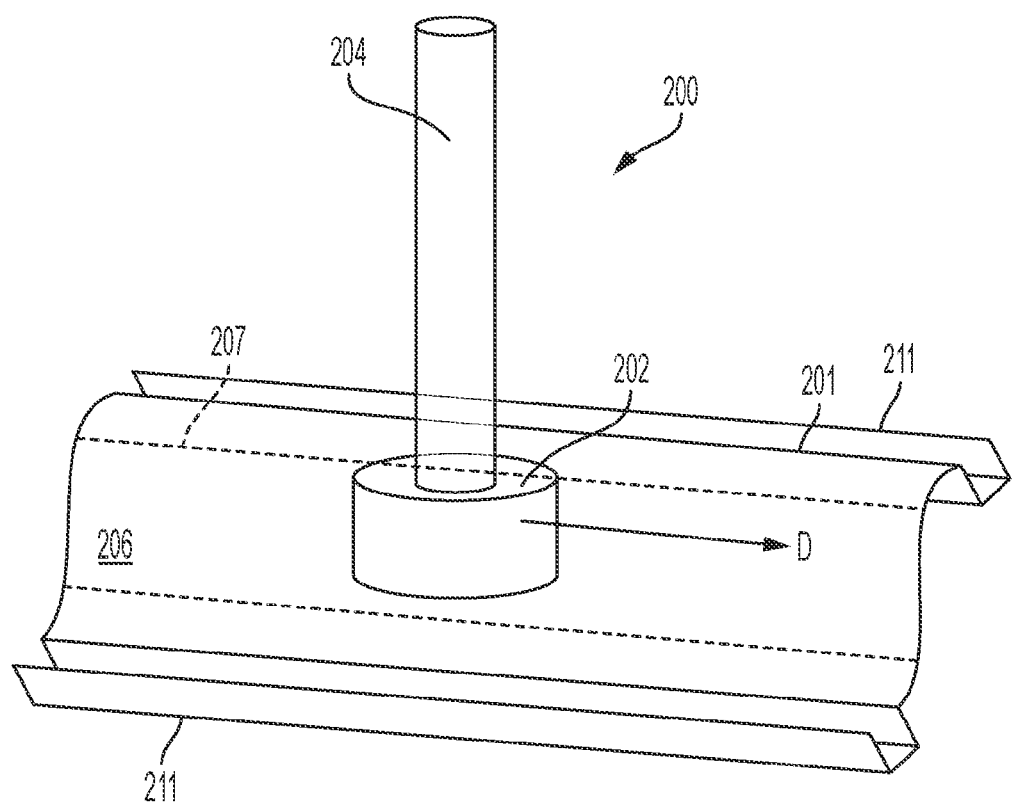
FIG. 8 is a diagram of a track segment of a liquid handler system, in accordance with at least one aspect of the present disclosure.

FIG. 8 shows an illustrative embodiment of a track segment 201 of an automation track system 200, such as the track system 160 as shown in FIGS. 4-7. As generally described above, the automation track system 200 is configured to support one or more vessel movers 202, which are configured to receive a vessel 204 (also referred to as a "carrier" or "sample carrier") therein. The track segment 201 can include a riding surface 206, which is the upper surface of the track segment 201 that supports the vessel mover 202 thereon and along which the vessel mover 202 is transported between the modules or components of the automation track system 200. In some embodiments, the riding surface 206 can include an active region 207 that the vessel mover 202 is intended to move along. As shown, the active region 207 is the area between the dashed lines. The active region 207 can generally correspond to the medial portion of the riding surface 206. If any liquid contaminants are present on the active region 207, they could negatively impact or otherwise impair the movement of the vessel movers 202, as noted above. In some embodiments, the track segment 201 could include a PCB substrate, as generally described above.

Figure 9:
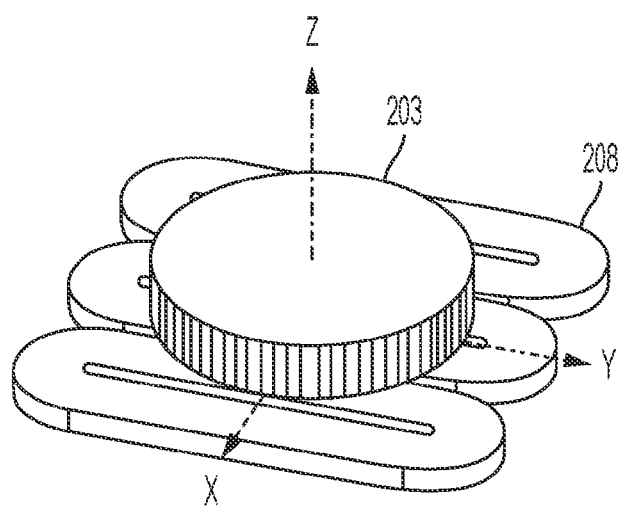
FIG. 9 is a diagram of a vessel mover actuator, in accordance with at least one aspect of the present disclosure.

Further, as shown in FIG. 9, the track system 200 can include one or more coil arrays 208 associated with each track segment 201. The coil arrays 208 can be configured to generate a magnetic field that interacts with the magnet 203 positioned within the base of the vessel movers 202. The coil arrays 208 and the vessel mover magnet 203 can collectively define a linear electromechanical actuator. By synchronously controlling the coil arrays 208, the track system 200 can propel the vessel movers 202 (and, thus, the vessels 204 containing any samples or other liquids held thereby) across the track segments 201 to the desired module or other component of the liquid handler system.

Additional information regarding transport systems for liquid handlers can be found in U.S. patent application Ser. No. 16/319,306, which is incorporated by reference above.

Sparse Hall Sensor-Based Sensing

Figure 10:
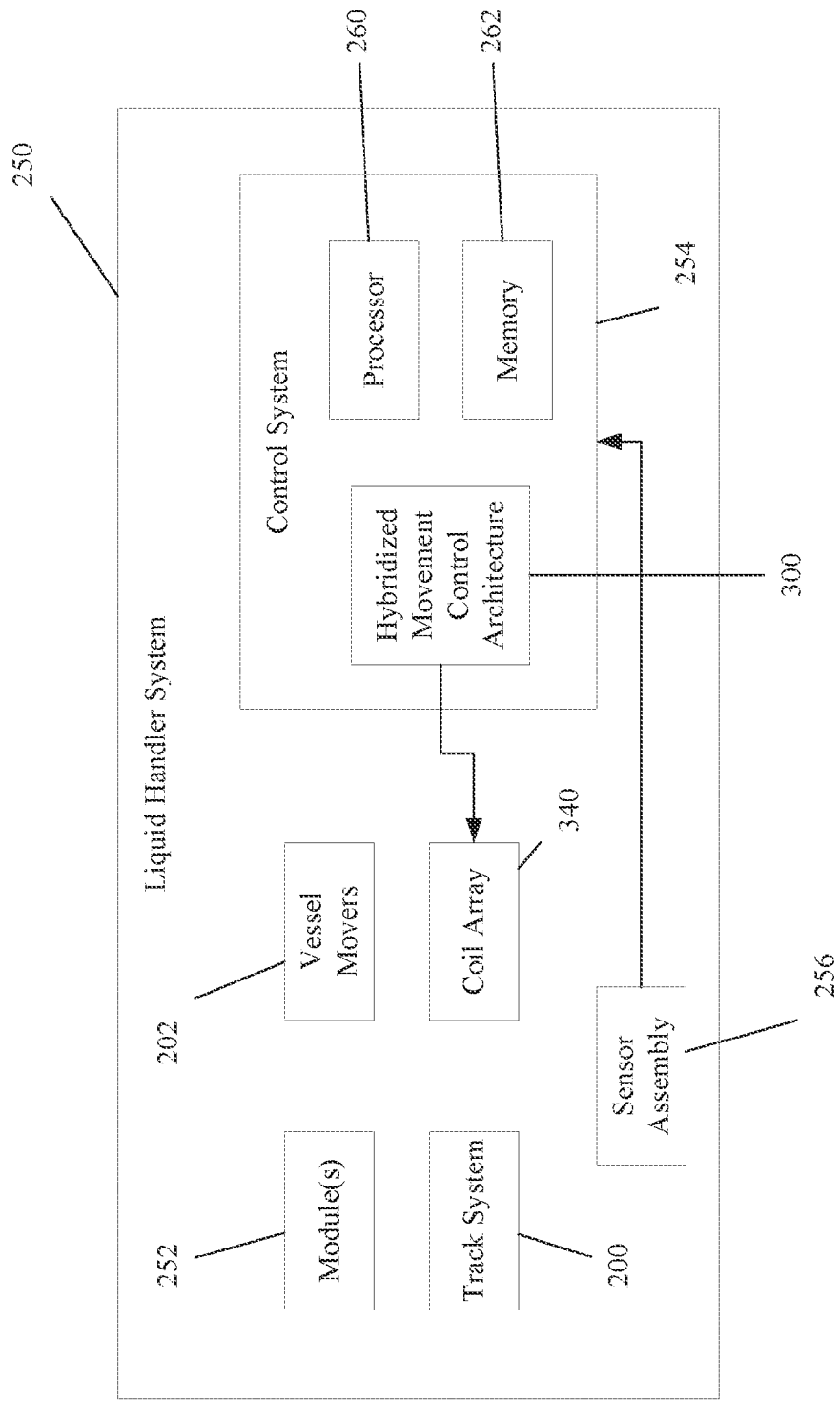
FIG. 10 is a diagram of a liquid handler system including a vessel tracking system, in accordance with at least one aspect of the present disclosure.

As generally described above and shown in FIG. 10, liquid handler systems 250 can include a one or more modules 252 that are configured to process liquid samples, a track system 200 interconnecting the various modules 252, vessel movers 202 that receive the liquid samples and transport the liquid samples between the various modules 252 along the track system 200, and a coil array 340 associated with the track system 200 that is configured to drive the vessel movers 202 therealong. The liquid handler system 250 can further include a tracking system 258 that is configured to monitor the locations of the vessel movers 202 along the track system 200 and control the movement and/or routing of the vessel movers 202 accordingly. The tracking system 258 can further include a control system 254 and a sensor assembly 256 (e.g., one or more Hall effect sensors) that is associated with the track system 200 and configured to detect the vessel movers 202 therealong. The control system 254 can be coupled with the coil array 340 and is configured to control the coil array 340 in order to control the movement and routing of the vessel movers 202 along the track system 200, which in turn allows the vessel movers 202 to transport the liquid samples between the modules 252 in particular sequences and with particular timings according to the types of liquid samples being processed by the liquid handler system 250. The control system 254 can include hardware, software, firmware, or any combination thereof that is able to execute the described functions. In the illustrated embodiment, the control system 254 includes a processor 260 coupled to a memory 262 storing instructions that, when executed by the processor 260, cause the control system 254 to execute the described processes, steps, and/or functions.

Figure 11A:
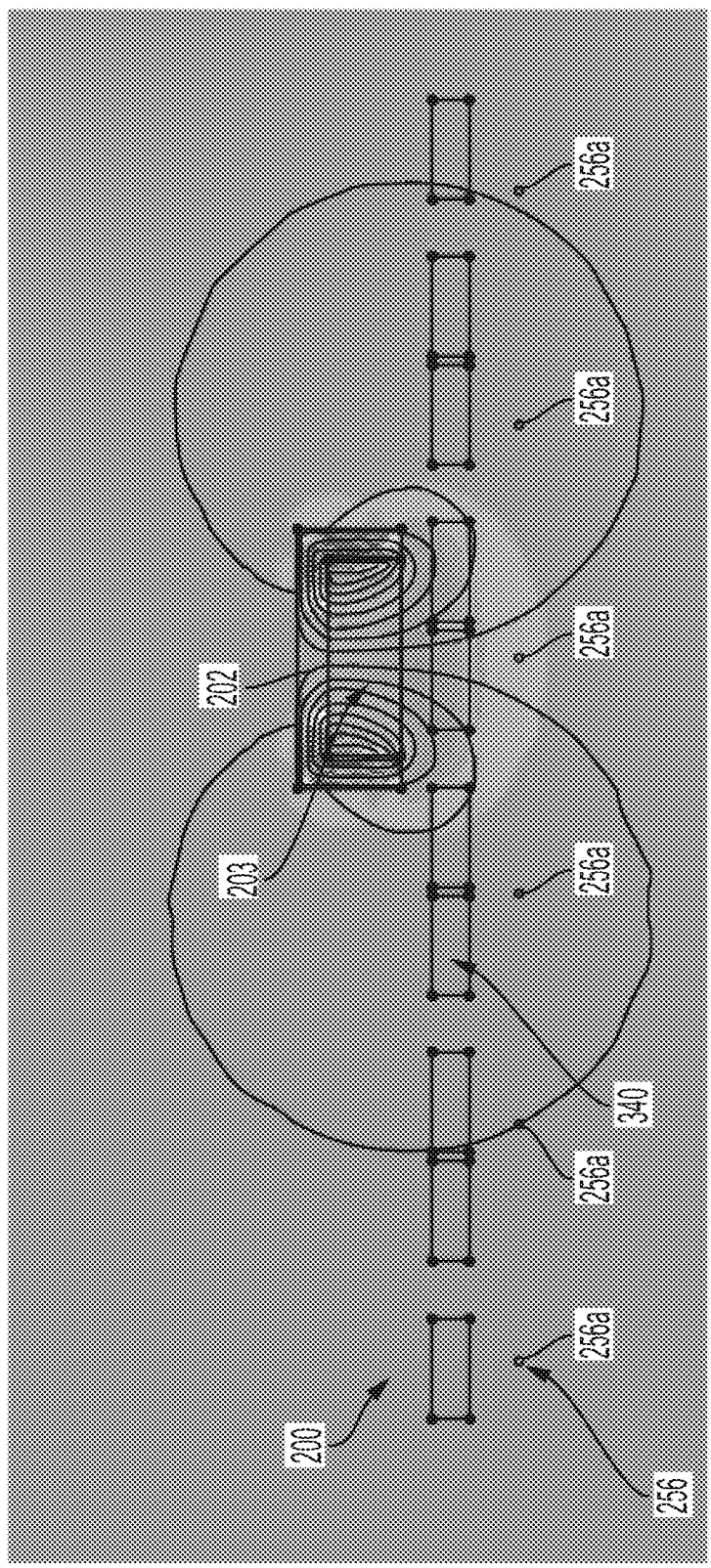
FIG. 11A is a diagram of a conventional sensor assembly arrangement for a liquid handler system track segment.
Figure 11B:
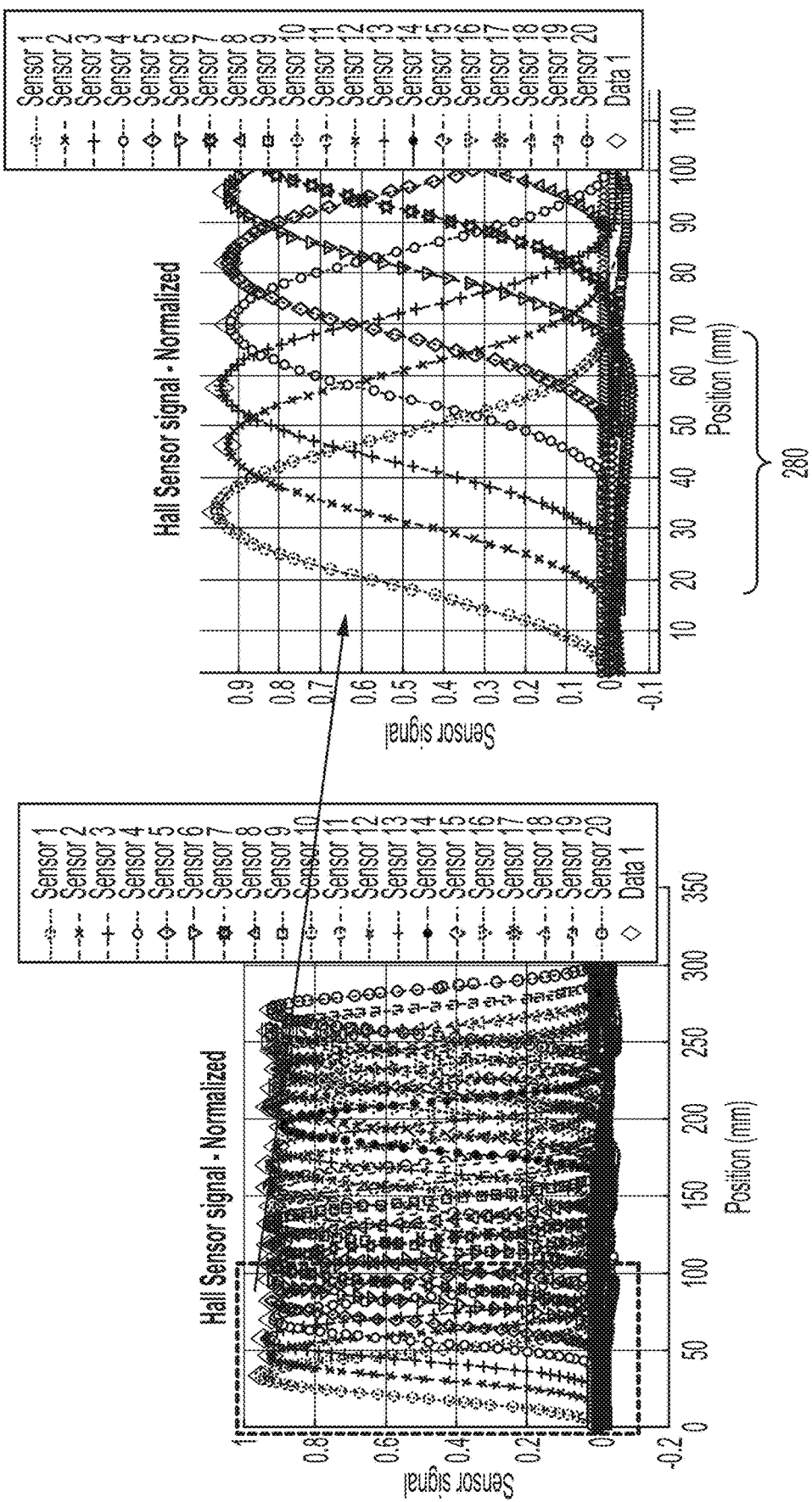
FIG. 11B is a graph illustrating the sensor output for the conventional sensor assembly illustrated in FIG. 11A.

Referring now to FIG. 11A, there is shown a diagram of a conventional arrangement for a sensor assembly 256 for a track segment of a liquid handler system 250. As can be seen, the sensor assembly 256 includes a series of Hall effect sensors 256a positioned longitudinally along the illustrated track segment of the track system 200. In this particular embodiment, the Hall effect sensors 256a are positioned below the coil array 340 extending along the undersurface of the track system 200; however, the Hall effect sensors 256a can also be arranged differently in other embodiments. In an illustrative embodiment, the sensor assembly 256 could include twenty Hall effect sensors 256a per track segment. Referring now to FIG. 11B, there is shown a graph depicting the sensor signal profiles for each of the Hall effect sensors 256a in the sensor assembly 256 shown in FIG. 11A. As can be seen, the signal profile for each Hall effect sensor 256a overlaps with the sensor profiles of one or more adjacent Hall effect sensors 256a. For example, the region 280 generally corresponds to the overlap of the sensors profiles between the first and second Hall effect sensors 256a. The remaining Hall effect sensors 256a in the sensor assembly 256 overlap with the adjacent Hall effect sensors 256a to a similar degree. Accordingly, conventional positional estimation schemes for vessel movers 202 based off of signals from Hall effect sensors 256a use a combination of outputs from two or more neighboring sensors 256a.

Figure 12:
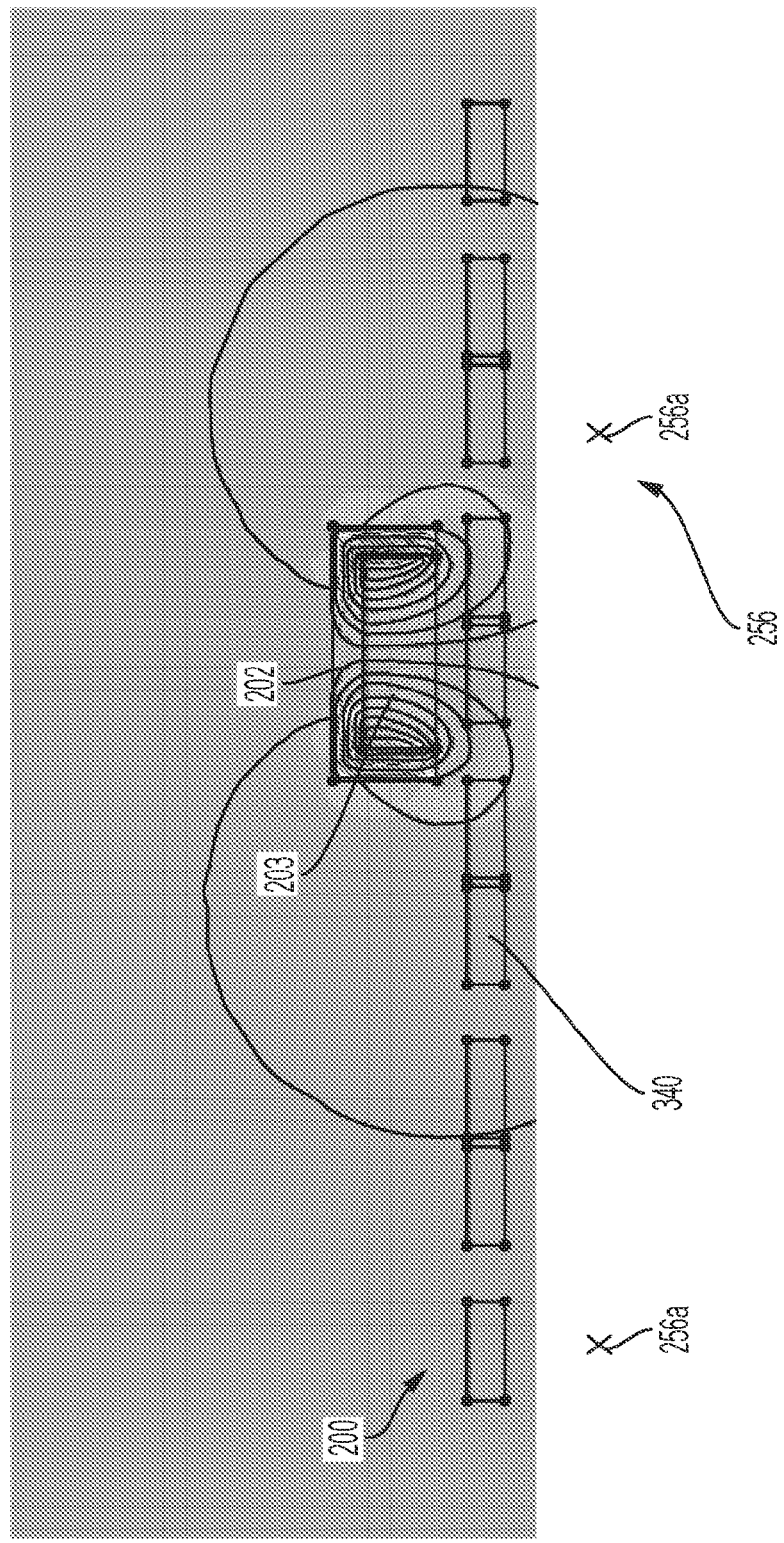
FIG. 12 is a diagram of a sparse sensor assembly arrangement for a liquid handler system track segment, in accordance with at least one aspect of the present disclosure.

In contrast to the conventional sensor assembly implementations shown in FIGS. 11A and 11B, the present disclosure is generally directed to sparse Hall effect sensor assemblies. For example, FIG. 12 shows an illustrative sensor assembly 256 for a track segment of a liquid handler system 250, wherein the sensor assembly 256 consists of a sparse arrangement of Hall effect sensors 256a (which can particularly be seen in comparison with the conventional implementation shown in FIG. 11A). In one embodiment, the sensor assembly 256 for each track segment of the track system 200 can include Hall effect sensors 256a that are positioned such that the signal profile from each of the Hall effect sensors 256a does not overlap beyond a threshold distance with an adjacent Hall effect sensor 256a. In one embodiment, the threshold distance could be close to zero, i.e., the signal profiles of the Hall effect sensors 256a would not overlap to any degree. However, as a practical matter, in some embodiments, the threshold distance is such that the signal profiles of the sensors overlap at a level that is at least 6 dB greater than the noise floor, but less than at least 6-10 dB of the signal profile peak. In some other cases the signal profiles from adjacent Hall sensors may be spatially separated. The position information required for motion control in such cases can be extracted from a suitable state estimation method during transit through the non-overlap zones. However, in applications such as Lab Automation track systems disturbances due to friction and other factors are present that may require continuous sensing without periods during which no sensory inputs are available to the controller for feedback. Hence, in such applications a minimally sufficient overlap between the sensor receptive fields is generally ensured with the sparse sensor configuration. The present disclosures describe solutions to ensure smooth transition between the sensor ranges through this overlapping/hand-off zone such that a smooth estimation of the motion state is made available to the controller. This is described in detail below. In one embodiment, a sparse arrangement of Hall effect sensors 256a could consist of five sensors 256a per track segment of the track system 200 (which could represent, for example, a four-fold decrease from conventional implementations).

Conventional synchronous linear motor tracks utilize a 3-phase motor design, laid out as a linear, repeating structure. In exemplary prior art systems, coils are laid out and operate 120 degrees out of phase. Hall effect sensors are typically placed at linear locations corresponding to 120 or 90 degrees in this relationship (as shown in FIG. 11A). This results in substantial overlap in the signal between sensors (such as shown in FIG. 11B). That is, when a magnet is placed equidistant between two sensors in a conventional linear motor system, the sensor value will be substantially (e.g., 90%) near that of the peak signal that would occur for that magnet if directly on top of a sensor. Exemplary embodiments lay out sensors at locations that are not guided by coil phase, instead placing sensors sparsely based on the effective view of the sensor. Using the principles described herein, the overlap of signal windows of adjacent windows can be substantially smaller than that shown in FIG. 11B. Exemplary embodiments allow sensor spacing such that sensors can be placed greater than 180 degrees apart (in terms of motor phase). Exemplary embodiments allow sensor spacing where the signal at the equidistant point between sensors is less than half (−6 db) that of the peak. (This is the equivalent of removing two-thirds of the sensors in FIG. 11B.) In some embodiments, the signal at the equidistant point is at least −10 db of the peak signal. In some embodiments, further separation between sensors is used. The natural limit to how sparse sensors can be placed is that the signal at the equidistant point should be at least 6 db greater than the noise floor.

In various embodiments, the Hall effect sensors are positioned such that a signal from each of the Hall effect sensors does not overlap beyond a threshold with an adjacent Hall effect sensor. This can be viewed as a signal level observed by each adjacent sensor at a location equidistant from each, where the signal level is the same for each sensor. In conventional systems, the signal level at this crossover location is quite high relative to the maximum signal level (when the magnet of the mover is directly at the location of the sensor). For example, the Hall effect sensors of FIG. 11B overlap around 90% (defined by the signal level of the sensors at the crossover point relative to the peak). In various embodiments, that overlap should be less than −6 db of peak; some embodiments use an overlap threshold of less than −10 db. The threshold should be large enough that the overlap is greater than 6 db of the noise floor.

Sparse sensor assemblies 256 can be beneficial because it can decrease the expense associated with the liquid handler system 250 because it can allow them to function with a fewer number of components (i.e., Hall effect sensors 256a). Further, adjacent track segments in a track system 200 for a conventional liquid handler system 250 should be communicably coupled together because the positional tracking relies upon adjacent signals from adjacent Hall effect sensors 256a, which could be present on a separate track segment board in the event that the vessel mover 202 is approaching the end of a track segment and/or is crossing onto a new track segment. Therefore, the track segments should be communicably coupled together so that the data and/or signals from the Hall effect sensors 256a can be shared thereacross in order to properly track the vessel movers 202 throughout the track system 200. The electrical and/or electronic interconnections required to effectuate communications by and between the sensors assemblies 256 of the various track segments creates a significant amount of additional uncertainty, which raises costs for setting up the liquid handler systems 250 and can limit their flexibility in some instances.

Figure 13:
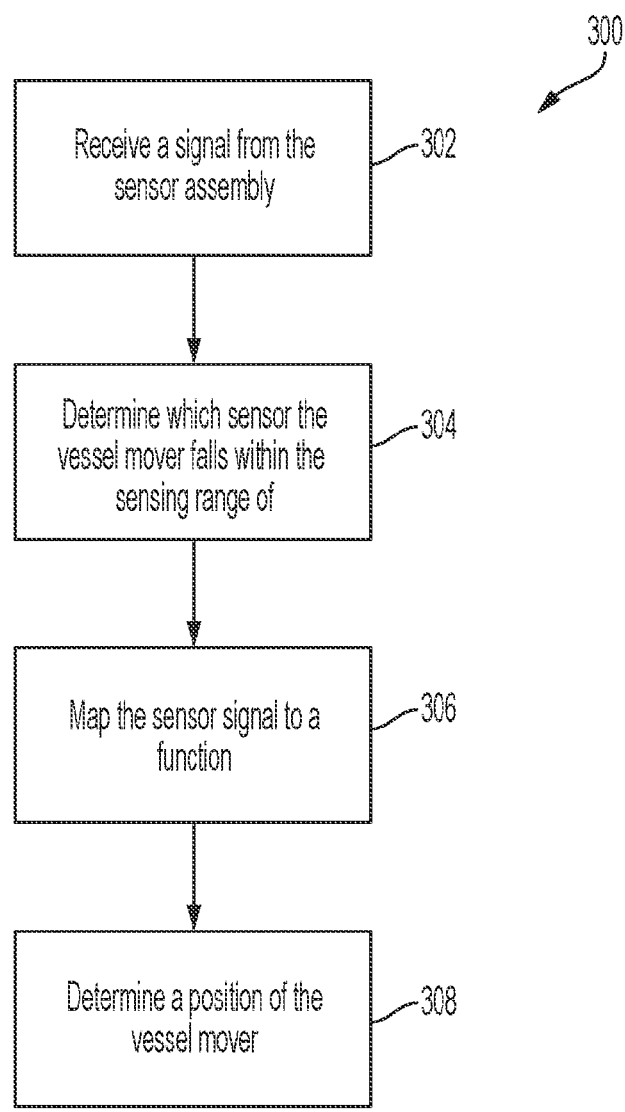
FIG. 13 is a flow diagram of a process for tracking a position of a vessel mover in a liquid handler system via a sparse sensor assembly, in accordance with at least one aspect of the present disclosure.

In order to effectuate such sparse sensor assemblies 256 wherein adjacent track segments do not need to be communicably coupled together, the embodiments of the vessel tracking system 258 described herein are configured to track the position of a vessel mover 202 based on a signal from a single Hall effect sensor 256a. One illustrative embodiment of a process 300 for tracking a position of a vessel mover 202 using a sparse sensor assembly 256 is shown in FIG. 13. The process 300 can be executed by, for example, the control system 254 described in connection with FIG. 10. In one embodiment, the process 300 could be embodied as instructions stored in the memory 262 that, when executed by the processor 260, cause the control system 254 to perform the described process 100 and/or steps thereof. Embodiments can utilize the full range of the receptive field of each Hall sensor in the array. This can maximally extend the sensing range of the sensors compared to traditional sensing schemes. This allows the sensors at the ends of the array on each segment to sense the vessel mover when approaching the junction between segments. This allows for autonomous sensing of the vessel mover as it transitions from one segment to another without requiring inter-segment communication of sensory signals or information regarding the state of the vessel mover estimated by the controllers on either or both of two adjacent segments. This reduces the data communication overhead and the resulting complexity significantly relative to traditional schemes. The sparse sensor array is configured such that the sensors at the ends of the segment can sense the vessel mover located on an adjacent segment at sufficiently large range to activate suitable autonomously tandem control action on either segment in order to smoothly transition the vessel mover across the junction between the adjacent track segments.

Accordingly, the control system 254 executing the process 300 can receive 302 a signal from each of the Hall effect sensors 256a of the sensor assembly 256 and determine 304 which of the Hall effect sensors 256a the vessel mover 202 is within the sensing range of. In one embodiment, the control system 254 could determine which of the Hall effect sensors 256a the vessel mover 202 is within the sensing range of by identifying which Hall effect sensor 256a is exhibiting a response signal (i.e., indicating that the particular Hall effect sensor 256a is sensing the magnet 203 of the vessel mover 202). This can be achieved through peak-detection across the signal array from the Hall sensors, for example. In the case of multiple movers on a segment, by specifying a minimum spacing threshold between peaks and/or setting thresholds for signal amplitude differences between adjacent peaks, a nearest-sensor association can be made for each of the vessel movers on the track segment.

Accordingly, the control system 254 can map 306 the sensor signal of the determined Hall effect sensor 256a (which can be referred to as the "sensing Hall effect sensor," i.e., the Hall effect sensor 256a that the vessel mover 202 is within the sensing range of) to a function that is configured to relate a strength of the signal to a distance with respect to the sending Hall effect sensor. In some embodiments, the control system 254 can retrieve one or more pre-characterized sensor signals that correspond to different distances and select the pre-characterized sensor signal that most closely maps to the received sensor signal. Since the retrieved pre-characterized sensor signals are already correlated with a pre-characterized distance from the Hall effect sensor 256a, the control system 254 can accordingly determine the distance that the vessel mover 202 is from the Hall effect sensor 256a based on which of the pre-characterized sensor signals that the received sensor signal maps to. In various embodiments, the functions to which the received sensor signals are mapped can include a variety of different measurement models, including a Lorentzian function, a Gaussian function, or a Sinc function. In some embodiments, the function can be one of a rational polynomial transfer function, a piecewise cubic or Hermitian polynomial, a Bezier spline function. The exact function chosen can depend on sensor types and sensor placement. In some embodiments, a system has several functions to choose from and the function can be chosen during a calibration sequence prior to using the vessel mover system during normal operation. In some embodiments, a lookup table can be used. For example, the expected response of the sensor to the changing magnetic field as the mover moves can be mapped to a predetermined curve having values in a table allowing a lookup of the current value in the table to approximate the location of the mover.

Figure 14:
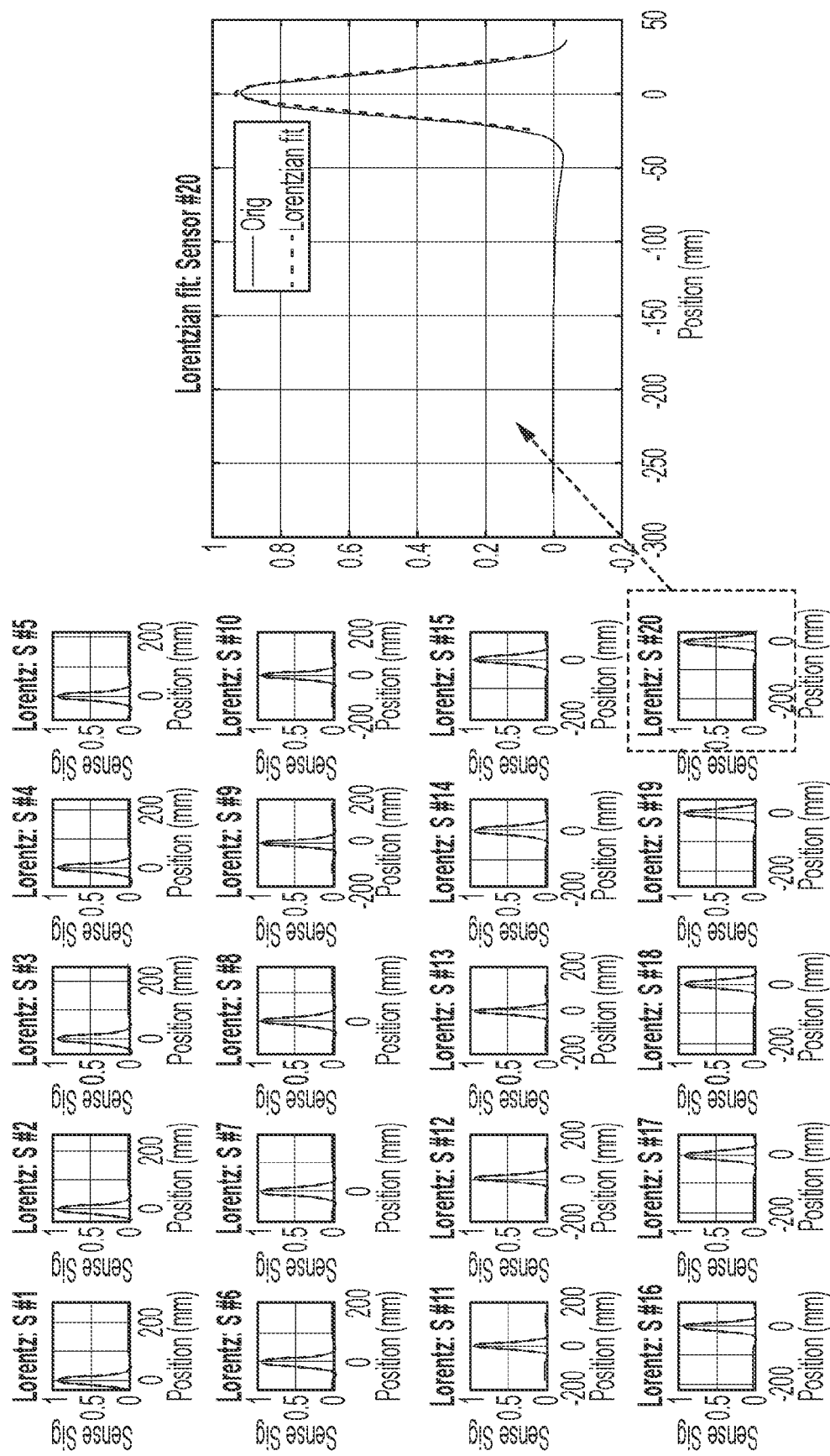
FIG. 14 is a series of plots of the Hall sensor signal modeled using a Lorentzian function, in accordance with at least one aspect of the present disclosure.

The control system 254 can be configured to perform a regression-based analysis to determine which of the measurement models that the received sensor signal most closely maps to. In some embodiments, the mover position-to-sensor signal mapping can be performed offline and the mapping then stored as a lookup table or a parametrized function on the microprocessor. For example, FIG. 14 illustrates various plots of the Hall sensor signal modeled using a Lorentzian function. As shown in the plots, the Lorentzian regression fit of a Hall sensor signal as a function of vessel mover position is sufficiently accurate (e.g., a RMS fit-error of <0.04 compared to a normalized maximum value of sensor signal of 1.0) such that the control system 254 can determine that the received signal maps to the particular function and parameters. Because the distance associated with the particular mapped function is pre-characterized or known, the control system 254 can determine the position of the vessel mover 202 with respect to the Hall effect sensor 256a and, accordingly, determine 308 the position of the vessel mover 202 along the track system (since the location of the particular Hall effect sensor 256a is known). Embodiments utilizing a Lorentzian function can be beneficial because a Lorentzian function and its Jacobian (i.e., partial derivatives with respect to the state variable) is relatively inexpensive to compute for the control system 254, which can provide a significant advantage for real-time or online state estimation.

In some embodiments, the vessel tracking system 258 can further track the position and/or velocity (i.e., the motion state) of a vessel mover 202 across the track system 202 as the vessel mover 202 moves in and out of the sensing range of individual Hall effect sensors 256a using a variety of different systems and/or techniques. For example, the control system 254 could implement an extended Kalman filter or other alternative state estimators to fuse the output from the sensor assemblies 256 in order to estimate and track the state of the vessel mover 202 across different individual Hall effect sensors 256a. In one embodiment, the control system 254 could be configured to perform a weighted estimate to fuse the sensor outputs and determine the state of the vessel mover 202. In another embodiment, the control system 256 could be configured to perform a cascaded estimation to fuse the sensor outputs and determine the state of the vessel mover 202.

A state estimator using an extended Kalman filter is algorithmically set up in this embodiment to utilize the sensor signal from the single nearest sensor when the vessel mover is within the receptive field exclusive to that sensor, and to use the signals from both adjacent sensors in a suitable combinatorial manner when the mover is within the overlapping region. In some configurations, the sensor arrays are laid out to have a minimally desired overlap in the receptive fields of adjacent sensors to facilitate a smooth transition between sensor fields. This provides a continuous and smooth estimate of position and velocity in a mathematical sense. In such cases, when the mover state is in the overlapping zone of the sensor fields, a fusion algorithm is applied to extract the most accurate state estimate. It is worth noting that in the ideally sparse sensor configuration, the overlap between receptive fields of adjacent sensors is in tail regions of the signal profile of each of the sensors. The diminished value of the sense signal relative to signal variance (noise) can therefore, result in inaccuracies in the state estimation. To address this issue, some embodiments use one of two approaches—in the overlap region, (1) a suitable weighting of the two sensor signals is applied to define the Observation/Measurement signal within the estimator; or (2) the two sensing signals are serially applied to the measurement update step of the extended Kalman filter (or other similar state estimators) to utilize the 'evidence' from both signals to update the state of the vessel mover motion. For method (1), the weights can be fixed (equal, for example), based on prior (previous time step) estimates of mover position relative to the sensors, or based on some measure of the relative strengths of the two sensor signals. The weighting skews the measurement update utilizing the two signals concurrently towards the sensor signal that is stronger or alternatively towards the signal from the sensor that is believed to be more proximate to the vessel mover based on a state estimate from the prior time step.

The motion state estimation for full-state feedback can be implemented in multiple ways. One embodiment includes estimating vessel mover position using the mapping between the sensor signal and mover position, feeding it into a reduced-order Observer or optimal filter to estimate velocity. Another embodiment includes incorporating the sensing model in a full-order observer or state estimator (such as an extended Kalman filter) and simultaneously estimating position and velocity.

In some embodiments, a weighted estimate scheme is used. An estimator is initially zero. A processor determines an index (relative position on a track segment) of the sensor that is most proximate to a magnet in the vessel mover based on a position estimate at t0. An array is created that includes the sensor value of the sensor at that index. If the index is not the first or last sensor on the segment, the sensor values of the immediately adjacent sensors is added to the array of sensor values. Weights are then assigned to the adjacent sensor values that are computed based on an estimate of the relative proximity of the magnet to each of those adjacent sensors (e.g., based on a motion state model). An extended Kalman filter forecasting step is applied. If the index is not the first or second sensor on the track segment, the processor performs a measurement update separated for each of the sensor measurements in the array. The processor computes a weighted average of new state estimates and state error covariance matrices. If the index is the first or last sensor in the track segment, the measurement update step applies the enhanced Kalman filter to the single sensor value.

In some embodiments, a cascaded estimate is used. The processor approaches sensor fusion the same way as for the weighted estimate embodiment, except in how the extended Kalman filter is applied to the sensor values of adjacent sensors in the array. In this embodiment, the measurement update step uses the sensor value corresponding to the sensor index. Then, the other sensor values in the array (i.e., adjacent sensors) are updated with the prediction state being the result of that update step. This causes a cascading or recursive update step as the processor applies the extended Kalman filter to the sensor values in the array.

Accordingly, the systems and methods described herein provide end-to-end position sensing based on the sensor assembly 256 located on the track segment over which the vessel mover 202 is currently moving, without needing Hall effect sensor signals from adjacent track segments to estimate the position of the vessel mover 202 when the vessel mover 202 is near either of the ends of a track segment. Further, the systems and methods described herein offer a significant reduction (e.g., a four-fold reduction) in the number of Hall effect sensors 256a required per track segment and, hence, provide a significant component cost savings, as well as reduced complexity associated with the circuit layout and signal multiplexing.

The Hall sensors used in some embodiments can be out-of-plane 1D sensors, in-plane 1D, in-plane 2D, or one out-of-plane and two in-plane (3D) sensors. In cases involving an out-of-plane Hall sensor and a magnet-array that generates a field symmetric in either direction along the axis of mover motion, sensing using a single sensor can entail an uncertainty about the relative +/− location of the mover relative to the sensor. This uncertainty can be addressed as follows. At start-up the mover can be moved a small amount along a set direction (e.g left/right FIG. 12). The trend in the sensor signal (decreasing/increasing) or the polarity of the change in the position estimates corresponding to the two mover placements then yields the orientation of the mover relative to the sensor along the axis of motion. As the vessel mover moves, the state estimator should converge on the true position and orientation of the mover relative to the sensor as it gathers more observations ('evidence') over a few successive time steps. Alternatively, an in-plane sensor can clarify the uncertainty in placement (left/right or up/down or +/−) of the mover relative to the sensor along the axis of motion. During normal operation (once the state is initialized correctly following this method), the prior information/estimate of the position and velocity can be used by the state estimator to accurately estimate the absolute location of the mover relative to the coordinate reference frame of the segment. When the mover is in motion, the polarity of change of the Hall signal over consecutive time steps can be used to determine whether the mover is to the left or right of the sensor. For example, if the sensor signal polarity change is positive over two or more consecutive time steps it would suggest the mover is moving towards the sensor. This information can determine whether the mover is to the left or right of the sensor depending on the direction of motion of the mover.

In some embodiments, alternate sensors to Hall effect sensors can be used using the methods described herein. Alternative sensors include magneto-resistive (MR and variants such as GMR & TMR), electric field sensors, optical sensors, and photoelectric sensors. The methods described herein can be applied to sensors that sense fields whose strength decays over distance.

In some embodiments, other estimators can also be used beyond those described herein. Alternative estimators that may be used in various embodiments include nonlinear observer, particle filters, ensemble Kalman filter, dynamic Bayesian models, weighted least squares estimator, and recursive least squares estimator.

While various illustrative embodiments incorporating the principles of the present teachings have been disclosed, the present teachings are not limited to the disclosed embodiments. Instead, this application is intended to cover any variations, uses, or adaptations of the present teachings and use its general principles. Further, this application is intended to cover such departures from the present disclosure that are within known or customary practice in the art to which these teachings pertain.

In the above detailed description, reference is made to the accompanying drawings, which form a part hereof. In the drawings, similar symbols typically identify similar components, unless context dictates otherwise. The illustrative embodiments described in the present disclosure are not meant to be limiting. Other embodiments may be used, and other changes may be made, without departing from the spirit or scope of the subject matter presented herein. It will be readily understood that various features of the present disclosure, as generally described herein, and illustrated in the Figures, can be arranged, substituted, combined, separated, and designed in a wide variety of different configurations, all of which are explicitly contemplated herein.

Aspects of the present technical solutions are described herein with reference to flowchart illustrations and/or block diagrams of methods, apparatuses (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present technical solutions. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action can be said to be "in response to" a first action independent of whether the second action results directly or indirectly from the first action. The second action can occur at a substantially later time than the first action and still be in response to the first action. Similarly, the second action can be said to be in response to the first action even if intervening actions take place between the first action and the second action, and even if one or more of the intervening actions directly cause the second action to be performed. For example, a second action can be in response to a first action if the first action sets a flag and a third action later initiates the second action whenever the flag is set.

The present disclosure is not to be limited in terms of the particular embodiments described in this application, which are intended as illustrations of various features. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

In addition, even if a specific number is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 components refers to groups having 1, 2, or 3 components. Similarly, a group having 1-5 components refers to groups having 1, 2, 3, 4, or 5 components, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A vessel tracking system for tracking a vessel mover in a liquid handler system, the liquid handler system comprising a track system, the vessel tracking system comprising:
   a sensor assembly associated with the track system, the sensor assembly comprising a plurality of Hall effect sensors positioned along the track system, wherein the Hall effect sensors are configured to detect a magnet positioned with the vessel mover, wherein the Hall effect sensors are positioned such that a signal from each of the Hall effect sensors does not overlap beyond a threshold with an adjacent Hall effect sensor that is less than 6 dB of a sensor peak value; and
   a control system coupled to the sensor assembly, the control system configured to:
      receive a signal from each of the plurality of Hall effect sensors,
      determine which of the plurality of Hall effect sensors the vessel mover falls within a sensing range of to define a sensing Hall effect sensor,
      map the signal from the sensing Hall effect sensor to a function, wherein the function is configured to relate a strength of the signal to a distance with respect to the sensing Hall effect sensor, and
      determine a position of the vessel mover based on the mapping of the signal from the sensing Hall effect sensor to the function.

2. The vessel tracking system of claim 1, wherein the control system is configured to fuse the plurality of singulated signals via an extended Kalman filter.

3. The vessel tracking system of claim 1, wherein the control system is configured to fuse the plurality of singulated signals via at least one of a weighted estimate and a cascaded estimate.

4. The vessel tracking system of any one of claim 1, wherein the signals from each adjacent pair of the Hall effect sensors overlap more than 6 dB over a noise floor.

5. The vessel tracking system of any one of claim 1, wherein the function is one of a group consisting of a Lorentzian function, a Sinc function, and a Gaussian function.

6. A liquid handler system for processing a liquid sample, the liquid handler system comprising:
   one or more modules configured to process the liquid sample;
   a track system interconnecting the one or more modules, the track system configured to support one or more vessel movers thereon, the one or more vessel movers comprising a magnet and configured to receive the liquid sample;
   a sensor assembly associated with the track system, the sensor assembly comprising a plurality of Hall effect sensors positioned along the track system, wherein the Hall effect sensors are configured to detect a magnet positioned with the vessel mover, wherein the Hall effect sensors are positioned such that a signal from each of the Hall effect sensors does not overlap beyond a threshold with an adjacent Hall effect sensor that is less than 6 dB of a sensor peak value; and
   a control system coupled to the sensor assembly, the control system configured to:
      receive a signal from each of the plurality of Hall effect sensors,
      determine which of the plurality of Hall effect sensors the vessel mover falls within a sensing range of to define a sensing Hall effect sensor,
      map the signal from the sensing Hall effect sensor to a function, wherein the function is configured to relate a strength of the signal to a distance with respect to the sensing Hall effect sensor, and
      determine a position of the vessel mover based on the mapping of the signal from the sensing Hall effect sensor to the function.

7. The liquid handler system of claim 6, wherein the control system is configured to fuse the plurality of singulated signals via an extended Kalman filter.

8. The liquid handler system of claim 6, wherein the control system is configured to fuse the plurality of singulated signals via at least one of a weighted estimate and a cascaded estimate.

9. The liquid handler system of any one of claim 6, wherein the signals from each adjacent pair of the Hall effect sensors overlap more than 6 dB over a noise floor.

10. The liquid handler system of any one of claim 6, wherein the function is one of a group consisting of a Lorentzian function, a Sinc function, a Gaussian function, and a rational polynomial transfer function.

11. A method of tracking vessel movers in a liquid handler system for processing a liquid sample, the liquid handler system comprising one or more modules configured to process the liquid sample, a track system interconnecting the one or more modules and configured to support one or more vessel movers thereon, the one or more vessel movers comprising a magnet and configured to receive the liquid sample, a sensor assembly associated with the track system and comprising a plurality of Hall effect sensors positioned along the track system, wherein the Hall effect sensors are configured to detect a magnet positioned with the vessel mover, wherein the Hall effect sensors are positioned such that a signal from each of the Hall effect sensors does not overlap beyond a threshold that is less than 6 dB of a sensor peak value with an adjacent Hall effect sensor, the method comprising:

receiving, by a control system coupled to the sensor assembly, a signal from each of the plurality of Hall effect sensors, determining, by the control system, which of the plurality of Hall effect sensors the vessel mover falls within a sensing range of to define a sensing Hall effect sensor, mapping, by the control system, the signal from the sensing Hall effect sensor to a function, wherein the function is configured to relate a strength of the signal to a distance with respect to the sensing Hall effect sensor, and determining, by the control system, a position of the vessel mover based on the mapping of the signal from the sensing Hall effect sensor to the function.

12. The method of claim 11, wherein the control system is configured to fuse the plurality of singulated signals via an extended Kalman filter.

13. The method of claim 11, wherein the control system is configured to fuse the plurality of singulated signals via at least one of a weighted estimate or a cascaded estimate.

14. The method of any one of claim 11, wherein the signals from each adjacent pair of the Hall effect sensors overlap more than 6 dB over a noise floor.

15. The method of any one of claim 11, wherein the function is one of a group consisting of a Lorentzian function, a Sinc function, and a Gaussian function.

16. The method of any one of claim 11, wherein the sensor assembly is divided into segments each comprising a circuit board and the method further comprises determining, by the control system, that the vessel mover is close to a junction of two adjacent segments to initiate a handoff of control of the vessel mover between segments.

* * * * *